United States Patent
Janssen et al.

(10) Patent No.: US 9,099,223 B2
(45) Date of Patent: Aug. 4, 2015

(54) COMPOSITE MATERIALS, PRODUCTION THEREOF AND USE THEREOF IN ELECTRICAL CELLS

(75) Inventors: Nicole Janssen, Bermersheim (DE); Alexander Panchenko, Ludwigshafen (DE); Oliver Gronwald, Frankfurt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/479,769

(22) Filed: May 24, 2012

(65) Prior Publication Data

US 2012/0298926 A1    Nov. 29, 2012

Related U.S. Application Data

(60) Provisional application No. 61/490,622, filed on May 27, 2011.

(51) Int. Cl.
| | |
|---|---|
| *H01M 4/13* | (2010.01) |
| *H01B 1/24* | (2006.01) |
| *H01M 4/62* | (2006.01) |
| *H01M 4/04* | (2006.01) |

(Continued)

(52) U.S. Cl.
CPC ............. *H01B 1/24* (2013.01); *H01M 4/0471* (2013.01); *H01M 4/623* (2013.01); *H01M 4/625* (2013.01); *F04D 23/008* (2013.01); *F04D 29/083* (2013.01); *F04D 29/106* (2013.01); *F04D 29/161* (2013.01); *H01M 4/08* (2013.01); *H01M 4/1393* (2013.01); *H01M 4/16* (2013.01); *H01M 4/8885* (2013.01); *H01M 8/04186* (2013.01)

(58) Field of Classification Search
CPC ... H01M 4/0471; H01M 4/08; H01M 4/1393; H01M 4/16; H01M 4/623; H01M 4/625; H01M 4/8885

USPC .......................... 429/314, 209, 231.9, 231.95
See application file for complete search history.

(56) References Cited

U.S. PATENT DOCUMENTS

| 7,745,528 B2 | 6/2010 | Prud'Homme et al. |
| 2004/0043291 A1* | 3/2004 | Kim et al. ..................... 429/217 |

(Continued)

FOREIGN PATENT DOCUMENTS

| CN | 101558455 A | 10/2009 |
| JP | 7-57723 A | 3/1995 |

(Continued)

OTHER PUBLICATIONS

Wang, et al., "Sulfur Composite Cathode Materials for Rechargeable Lithium Batteries", Advanced Functional Materials, vol. 13 No. 6, Jun. 2003, pp. 487-492.*

(Continued)

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

The present invention relates to composite materials comprising a reaction product of (A) at least one organic polymer, (B) sulfur, (C) carbon in a polymorph which comprises at least 60% $sp^2$-hybridized carbon atoms, and (D) 2-20% by weight of a perfluorinated or partly fluorinated polymer, based on the total weight of components (A), (B) and (C) used before reaction, and also to a process for producing inventive composite materials and to the use of inventive composite materials.

9 Claims, 1 Drawing Sheet

(51) Int. Cl.

| | |
|---|---|
| F04D 29/16 | (2006.01) |
| F04D 29/10 | (2006.01) |
| F04D 29/08 | (2006.01) |
| F04D 23/00 | (2006.01) |
| H01M 8/04 | (2006.01) |
| H01M 4/1393 | (2010.01) |
| H01M 4/88 | (2006.01) |
| H01M 4/08 | (2006.01) |
| H01M 4/16 | (2006.01) |

(56) References Cited

U.S. PATENT DOCUMENTS

| | | | |
|---|---|---|---|
| 2007/0287060 A1* | 12/2007 | Naoi et al. | 429/122 |
| 2010/0096597 A1 | 4/2010 | Prud'Homme et al. | |
| 2010/0247923 A1 | 9/2010 | Hsu | |
| 2010/0261050 A1 | 10/2010 | Kang et al. | |
| 2011/0003189 A1 | 1/2011 | Hildebrandt et al. | |
| 2011/0052998 A1 | 3/2011 | Liang et al. | |
| 2011/0186789 A1 | 8/2011 | Samulski et al. | |
| 2011/0260100 A1 | 10/2011 | Trukhan et al. | |
| 2011/0262835 A1 | 10/2011 | Ünsal et al. | |
| 2011/0284805 A1 | 11/2011 | Samulski et al. | |
| 2011/0311901 A1 | 12/2011 | Fleischhaker et al. | |
| 2011/0318654 A1* | 12/2011 | Janssen | 429/338 |

FOREIGN PATENT DOCUMENTS

| | | |
|---|---|---|
| WO | WO 2009/117460 A1 | 9/2009 |
| WO | WO 2009/143405 A2 | 11/2009 |
| WO | WO 2011/148357 A1 | 12/2011 |

OTHER PUBLICATIONS

International Search Report issued Sep. 20, 2012, in International Application No. PCT/IB2012/052575.
U.S. Appl. No. 13/794,971, filed Mar. 12, 2013, Leitner, et al.
U.S. Appl. No. 13/489,101, filed Jun. 5, 2012, Gronwald, et al.
Meilin Liu et al., "Novel Solid Redox Polymerization Electrodes", J. Electrochem. Soc., vol. 138, No. 7, Jul. 1991, pp. 1896-1901.
Jiulin Wang et al., "Sulfur Composite Cathode Materials for Rechargeable Lithium Batteries", Advanced Functional Materials, vol. 13, No. 6, Jun. 2003, pp. 487-492.
Peng Wang, "The Nature of the Interaction Between Polyaniline and 2,5-Dimercapto-1,3,4-thiadiazole in Electrochemical Redox Processes", Journal of the Electrochemical Society, vol. 149, No. 9, 2002, pp. A1171-A1174.
Jiulin Wang et al., "Electrochemcial characteristics of sulfur composite cathode materials in rechargeable lithium batteries", Journal of Power Sources, vol. 138, 2004, pp. 271-273.
Jiulin Wang et al., "A Novel Conductive Polymer-Sulfur Composite Cathode Material for Rechargeable Lithium Batteries", Advanced Materials, vol. 14, No. 13-14, Jul. 4, 2002, pp. 963-965.
European Search Report in application No. 12792642.6, dated Dec. 12, 2014.
X. Ji, et al., "Stabilizing lithium-sulphur cathodes using polysulphide reservoirs", Nature Communications, 2011, pp. 1-7.
Jiulin Wang, al., "Sulfur Composite Cathode Materials for Rechargeable Lithium Batteries", Advanced Functional Materials, vol. 13, No. 6, Jun. 2003, pp. 487-492.
Peng Wang, "The Nature of the Interaction Between Polyaniline and 2,5-Dimercapto-1,3,4-thiadiazole in Electrochemical Redox Processes", Journal of the Electrochemical Society, vol. 149, 2002, pp. A1171-A1174.
Jiulin Wang, et al., "Electrochemical characteristics of sulfur composite cathode materials in rechargeable lithium batteries", Journal of Power Sources, vol. 138, 2004, pp. 271-273.
Jiulin Wang, et al., "A Novel Conductive Polymer-Sulfur Composite Cathode Material for Rechargeable Lithium Batteries", Advanced Materials, vol. 14, No. 13-14, Jul. 4, 2002, pp. 963-965.
International Search Report issued Sep. 29, 2011, in Patent Application No. PCT/IB2011/052353.
Jiulin Wang, et al., "Room Temperature Na/S batteries with sulfur composite cathode materials", Electrochemistry Communications, vol. 9, 2007, pp. 31-34.
Xiangming He, et al., "Charge/discharge characteristics of sulfur composite electrode at different temperature and current density in rechargeable lithium batteries", Ionics, vol. 14, 2008, pp. 335-337.
Xiangming He, et al., "Charge/discharge characteristics of sulfur composite cathode materials in rechargeable lithium batteries", Electrochimica Acta, vol. 52, 2007, pp. 7372-7376.

* cited by examiner

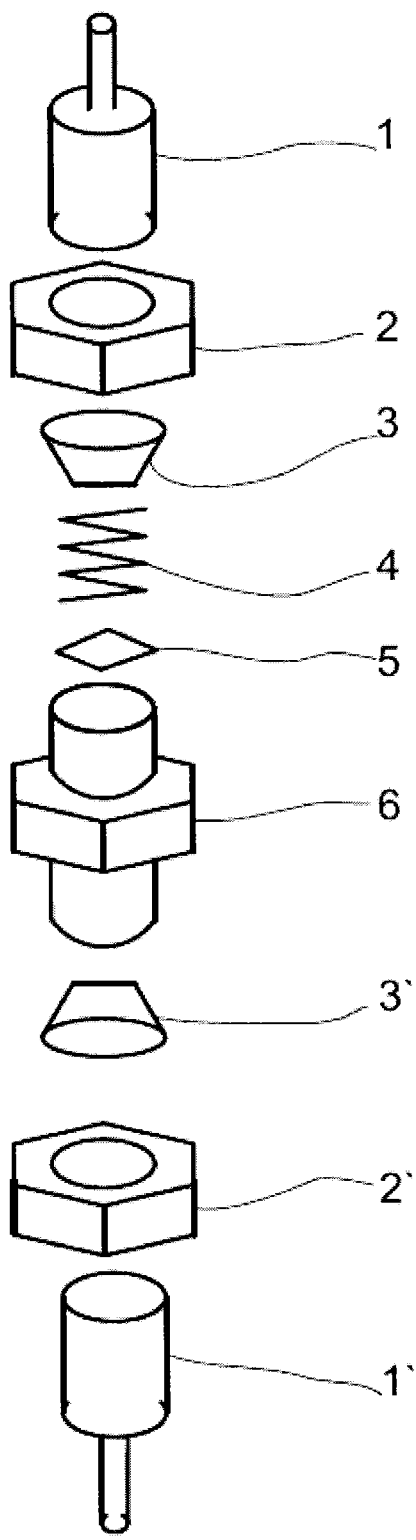

COMPOSITE MATERIALS, PRODUCTION THEREOF AND USE THEREOF IN ELECTRICAL CELLS

The present invention relates to composite materials comprising a reaction product of
(A) at least one organic polymer,
(B) sulfur,
(C) carbon in a polymorph which comprises at least 60% $sp^2$-hybridized carbon atoms, and
(D) 2-20% by weight of a perfluorinated or partly fluorinated polymer, based on the total weight of components (A), (B) and (C) used before reaction.

The present invention further relates to a process for producing inventive composite materials and to the use of inventive composite materials.

Secondary batteries or rechargeable batteries are just some embodiments by which electrical energy can be stored after generation and used when required. Owing to the significantly better power density, there has been a departure in recent times from water-based secondary batteries to development of batteries in which the charge transport in the electrical cell is accomplished by lithium ions.

However, the energy density of conventional lithium ion batteries which have a carbon anode and a cathode based on metal oxides is limited. New horizons with regard to energy density have been opened up by lithium-sulfur cells. In lithium-sulfur cells, sulfur in the sulfur cathode is reduced via polysulfide ions to $S^{2-}$, which is reoxidized to form sulfur-sulfur bonds when the cell is charged.

A problem, however, is the solubility of the polysulfides, for example $Li_2S_4$ and $Li_2S_6$, which are soluble in the solvent and can migrate to the anode. The consequences may include: loss of capacitance and deposition of electrically insulating material on the sulfur particles of the electrode. The migration from cathode to anode can ultimately lead to discharge of the affected cell and to cell death in the battery. This unwanted migration of polysulfide ions is also referred to as "shuttling", a term which is also used in the context of the present invention.

There are numerous attempts to suppress this shuttling. For example, J. Wang et al propose adding a reaction product of sulfur and polyacrylonitrile to the cathode; *Adv. Funct. Mater.* 2003, 13, 487 ff. This forms a product which arises by elimination of hydrogen from polyacrylonitrile with simultaneous formation of hydrogen sulfide.

It has additionally been proposed to use sulfides instead of sulfur, for example CuS, $FeS_2$ or 2,5-dimercapto-1,3,4-thiadiazole. However, the capacitance of such cells was unsatisfactory; see, for example, P. Wang, *J. Electrochem. Soc.* 2002, A1171-1174, 149 and J. Wang et al, *J. Power Sources* 2004, 138, 271.

It has additionally been proposed to use the sulfur in finely dispersed form; see J. Wang et al, *J. Power Sources* 2004, 138, 271. At high current density, however, fluctuations in efficiency were observed, which the authors attribute to deposition of lithium dendrites. These can be troublesome in that they lead to internal short circuits.

It has additionally been proposed to mix the reaction product of sulfur with polyacrylonitrile with carbon black, and to press it to electrodes; J. Wang et al, *Adv. Mater.* 2002, 14, 963 ff. When such electrodes are combined with a polymer as the electrolyte, a decrease in the shuttling mechanism is observed. However, many polymer electrolytes have low conductivity.

It was thus an object of the present invention to provide a cathode material which is simple to produce and which avoids the disadvantages known from the prior art. It was a further object of the present invention to provide a process by which a corresponding cathode material can be produced.

Accordingly, the materials defined at the outset have been found.

The inventive materials are composite materials, which are also referred to as inventive composite materials in the context of the present invention. Composite materials are understood to mean materials which are solid mixtures which cannot be separated manually and which have different properties than the individual components. The inventive materials are, especially, particulate composite materials.

Inventive composite material comprises a reaction product of
(A) at least one organic polymer, referred to as polymer (A) or organic polymer (A) for short, the expression polymer in the context of the present invention comprising homopolymers and also copolymers,
(B) sulfur,
(C) carbon in a polymorph which comprises at least 60% $sp^2$-hybridized carbon atoms and
(D) 2-20% by weight of a perfluorinated or partly fluorinated polymer, based on the total weight of components (A), (B) and (C) used before reaction.

Polymer (A) can be selected from any organic polymers and copolymers, preferably from polymers obtainable by anionic or free-radical (co)polymerization. The organic polymers or copolymers preferably consist of atoms of the elements carbon and hydrogen, and optionally nitrogen, phosphorus, oxygen, sulfur and/or chlorine, especially of the atoms of the elements carbon and hydrogen, and optionally nitrogen, oxygen and/or chlorine, especially nitrogen.

The term "(co)polymerization" represents a homopolymerization or a copolymerization. The term "(co)polymer" represents a homopolymer or a copolymer.

In another variant, polymer (A) can be selected from organic polyesters, especially from aliphatic polyesters.

In one embodiment of the present invention, polymer (A) is selected from (co)polymers obtainable by anionic, catalytic or free-radical (co)polymerization, especially from polyethylene, polypropylene, polyacrylonitrile, polybutadiene, polystyrene and copolymers of at least two comonomers selected from ethylene, propylene, styrene, (meth)acrylonitrile, especially acrylonitrile, and 1,3-butadiene. Polyisoprene and polyacrylates are additionally suitable. Particular preference is given to polyacrylonitrile, also referred to as polyacrylonitrile (A) in the context of the present invention.

In the context of the present invention, polyacrylonitrile is not only understood to mean polyacrylonitrile homopolymers, but also copolymers of acrylonitrile with 1,3-butadiene or styrene. Preference is given to polyacrylonitrile homopolymers.

In one embodiment of the present invention, polyacrylonitrile (A) is present after the reaction, i.e. in the inventive composite material, at least partially in the form of a cyclization product of the formula (I)

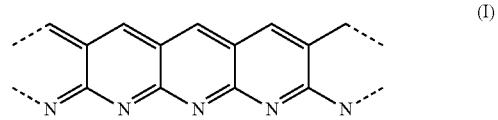

In the context of the present invention, polyethylene is understood to mean not only homopolyethylene but also copolymers of ethylene which comprise at least 50 mol % of ethylene in copolymerized form, and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of propylene in copolymerized form, and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers of styrene with acrylonitrile, 1,3-butadiene, (meth)acrylic acid, $C_1$-$C_{10}$-alkyl esters of (meth)acrylic acid, divinylbenzene, 1,2-diphenylethylene or α-methylstyrene, especially with acrylonitrile or 1,3-butadiene.

Another preferred polymer (A) is polybutadiene.

In one embodiment of the present invention, polymer (A) is selected from those which, before the reaction, have a mean molecular weight $M_w$ in the range from 50 000 to 500 000 g/mol, preferably to 250 000 g/mol.

In one embodiment of the present invention, polyacrylonitrile (A) is selected from those polyacrylonitriles which, before the reaction, have a mean molecular weight $M_w$ in the range from 10 000 to 500 000 g/mol, especially from 50 000 to 250 000 g/mol.

Polymer (A) may be crosslinked or uncrosslinked (co) polymers.

Sulfur (B) is known as such and can also be referred to for short as sulfur in the context of the present invention.

Carbon in a polymorph which comprises at least 60% $sp^2$-hybridized carbon atoms, preferably at least 75% $sp^2$-hybridized carbon atoms, also referred to as carbon (C) for short in the context of the present invention, is known as such. The carbon (C) is an electrically conductive polymorph of carbon. For instance, carbon (C) may be graphite.

Figures in % are based on all of the carbon (C) incorporated into inventive composite material under chemically reactive conditions, including any impurities, and denote percent by weight.

In one embodiment of the present invention, carbon (C) is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

The carbon (C) for the preparation of the reaction product for the inventive composite material is preferably selected from carbon black.

In one variant, carbon (C) is partially oxidized carbon black.

In one embodiment of the present invention, carbon (C) comprises carbon nanotubes. Carbon nanotubes (CNTs for short), for example single-wall carbon nanotubes, SW CNT) and preferably multiwall carbon nanotubes (MW CNT), are known per se. A process for preparation thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon-containing compounds in a light arc, specifically in the presence or absence of a decomposition catalyst.

In one embodiment, the decomposition of volatile carbon-containing compound or carbon-containing compounds is performed in the presence of a decomposition catalyst, for example Fe, Co or preferably Ni.

The starting mixture for preparation of the reaction product for the inventive composite material comprises, as component (D) 2-20% by weight, preferably 3-15% by weight, especially 4-10% by weight, of a perfluorinated or partly fluorinated polymer (D) based on the total weight of the components (A), (B) and (C) used before reaction.

Examples of perfluorinated or partly fluorinated polymers (D) may be fluorinated homo- or copolymers. Polymer (D) is preferably selected from the group of fluorinated polymers consisting of polytetrafluoroethylene, polyvinyl fluoride, polyvinylidene fluoride, tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether-copolymers, ethylene-tetrafluoroethylene copolymers, vinylidene fluoride-chlorotrifluoroethylene copolymers and ethylene-chlorofluoroethylene copolymers.

The perfluorinated or partly fluorinated polymer (D) is preferably used in powder form. Particular preference is given to using a powder with an average particle size of 0.1 to 10 μm, especially 0.5 to 2 μm.

In the context of the present invention, polytetrafluoroethylene is understood to mean not only polytetrafluoroethylene homopolymers, but also copolymers of tetrafluoro-ethylene with hexafluoropropylene or vinylidene fluoride, and terpolymers consisting of tetrafluoroethylene, hexafluoropropylene and vinylidene fluoride.

The perfluorinated or partly fluorinated polymer (D) is preferably polytetrafluoroethylene, especially polytetrafluoroethylene homopolymer.

At least two of the aforementioned starting materials have reacted chemically with one another in the course of preparation of inventive composite material, preferably polymer (A) and sulfur. In this context, it is not necessary that polymer (A) and sulfur have entered into covalent bonds with one another. For example, it is possible that sulfur serves merely as an oxidizing agent and is removed from the reaction mixture as $H_2S$.

In one embodiment of the present invention, polymer (A) and sulfur (B) have entered into covalent bonds in the course of formation of inventive composite material.

In a preferred embodiment, the inventive composite material further comprises particles or domains which comprise carbon (C) filled with sulfur (B). In such an embodiment of the present invention, sulfur is preferably molecularly dispersed in carbon (C) in such particles or domains, for example in the form of $S_8$ rings or in the form of linear sulfur molecules, for example linear $S_8$ molecules.

Such particles or domains can be detected, for example, by electron probe microanalysis.

In one embodiment of the present invention, the pores of carbon (C) in such particles or domains are at least partially filled with sulfur (B).

Such particles or domains may have a mean diameter in the range from 10 to 100 μm, preferably to 70 μm.

These particles are removable mechanically from inventive composite material. Domains are not removable mechanically from inventive composite material. Domains and particles are readily identifiable under the microscope.

In one embodiment of the present invention, such particles or domains comprise carbon (C) and sulfur (B) in a weight ratio in the range from 2:1 to 1:15, preferably 1:1.5 to 1:10.

Above-described particles or domains preferably appear black to the human eye.

In one embodiment of the present invention, above-described particles or domains comprise not more than 5% by weight of polymer (A) or not more than 5% by weight of above-described reaction product. In a specific embodiment of the present invention, neither polymer (A) nor above-described reaction product can be detected in the above-described particles or domains.

Inventive composite material may further comprise particles or domains which comprise significant proportions of above-described reaction product, for example to an extent of at least 10% by weight. The latter particles or domains may have a diameter in the range from 5 to 75 μm, preferably 10 to 50 μm. They are preferably smaller than the former particles or domains.

In one embodiment of the present invention, inventive composite material comprises in the range from 20 to 80% by weight, preferably 30 to 70% by weight, of sulfur, determined by elemental analysis.

In one embodiment of the present invention, inventive composite material comprises in the range from 0.1 to 30% by weight of carbon (C), preferably 1 to 20% by weight. This carbon is likewise determinable, for example, by elemental analysis, though it must be taken into account in the evaluation of the elemental analysis that carbon also gets into inventive composite material via polymer (A).

In order to obtain a reaction product for the inventive composite material from components (A), (B), (C) and (D) with a desired sulfur content, the loss of sulfur used as a result of the reaction of the sulfur with hydrogen atoms of the polymer (A) to form gaseous hydrogen sulfide has to be taken into account.

Based on the total weight of components (A), (B) and (C) used before reaction, the proportion for component (A), especially in the case of polyacrylonitrile, before reaction is preferably in the range from 4.9 to 45% by weight, especially 10 to 40% by weight, the proportion for component (B) before reaction is preferably in the range from 35 to 95% by weight, especially 45 to 85% by weight, and the proportion for component (C) before reaction is preferably in the range from 0.1 to 20% by weight, especially 5 to 15% by weight.

In a further embodiment of the present invention, inventive composite material may further comprise at least one binder (E). Binder (E) serves principally for mechanical stabilization of inventive composite material.

In one embodiment of the present invention, binder (E) is selected from organic (co)polymers. Examples of suitable organic (co)polymers may be halogenated or halogen-free. Examples are polyethylene oxide (PEO), cellulose, carboxymethyl-cellulose, polyvinyl alcohol, polyethylene, polypropylene, polytetrafluoroethylene, polyacrylonitrile-methyl methacrylate copolymers, styrene-butadiene copolymers, tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers, ethylene-chlorofluoroethylene copolymers, ethylene-acrylic acid copolymers, optionally at least partially neutralized with alkali metal salt or ammonia, ethylene-methacrylic acid copolymers, optionally at least partially neutralized with alkali metal salt or ammonia, ethylene-(meth)acrylic ester copolymers, polyimides and polyisobutene.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

The mean molecular weight $M_w$ of binder (E) may be selected within wide limits, suitable examples being 20 000 g/mol to 1 000 000 g/mol.

If binder (E) is used for the production of the inventive composite material, inventive composite material preferably comprises in the range from 0.1 to 10% by weight, more preferably 5 to 10% by weight and most preferably 7 to 8% by weight of binder (E), based on the mass of the finished composite material.

Binder (E) can be incorporated into inventive composite material by various processes. For example, it is possible to dissolve soluble binders (E) such as polyvinyl alcohol in a suitable solvent or solvent mixture, water/isopropanol for example being suitable for polyvinyl alcohol, and to prepare a suspension with the further constituents of the cathode. After application to a suitable substrate, the solvent or solvent mixture is removed, for example evaporated, to obtain inventive composite material. A suitable solvent for polyvinylidene fluoride is NMP.

If it is desired to use sparingly soluble polymers as the binder (E), for example additional perfluorinated or partly fluorinated (co)polymers such as polytetrafluoroethylene or tetrafluoroethylene-hexafluoropropylene copolymers, a suspension of particles of the binder (E) in question and of the further constituents of the cathode is prepared, and compressed under hot conditions.

In one embodiment of the present invention, inventive composite material additionally comprises carbon, which is incorporated into the composite material under nonreactive conditions. This additional carbon may be selected from the same materials as carbon (C). It may in each case be the same as or different than carbon (C); for example, the carbon (C) and the additional carbon selected may be two different carbon blacks or graphites.

In one embodiment of the present invention, inventive composite material additionally comprises carbon black which has not been reacted with organic polymer (A) or polyacrylonitrile (A) and sulfur (B).

In one embodiment of the present invention, inventive composite material comprises in the range from 0.1 to 10% by weight of additional carbon, preferably additional carbon black, based on the mass of the finished composite material.

Inventive composite materials are particularly suitable as or for production of electrodes, especially for production of electrodes of lithium-containing batteries. The present invention provides for the use of inventive composite materials as or for production of electrodes for electrical cells. The present invention further provides electrical cells comprising at least one electrode which has been produced from or using at least one inventive composite material.

In one embodiment of the present invention, the electrode in question is the cathode, which can also be referred to as the sulfur cathode or S cathode. In the context of the present invention, the electrode referred to as the cathode is that which has reducing action on discharge (operation).

In one embodiment of the present invention, inventive composite material is processed to give electrodes, for example in the form of continuous belts which are processed by the battery manufacturer.

Electrodes produced from inventive composite material may, for example, have thicknesses in the range from 20 to 500 μm, preferably 40 to 200 μm. They may, for example, have a rod-shaped configuration, or be configured in the form of round, elliptical or square columns or in cuboidal form, or as flat electrodes.

In one embodiment of the present invention, inventive electrical cells comprise, as well as inventive composite material, at least one electrode which comprises metallic zinc, metallic sodium or preferably metallic lithium.

In one embodiment of the present invention, inventive electrical cells comprise, in addition to inventive composite material and a further electrode, at least one nonaqueous solvent which may be liquid or solid at room temperature, preferably selected from polymers, cyclic or noncyclic ethers, cyclic or noncyclic acetals, cyclic or noncyclic organic carbonates and ionic liquids.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (II) and (III)

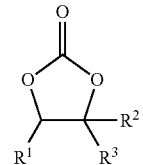

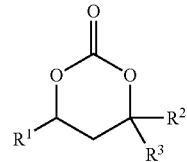

in which $R^1$, $R^2$ and $R^3$ may be the same or different and are selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

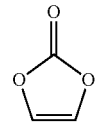

The solvent(s) is (are) preferably used in what is known as the anhydrous state, i.e. with a water content in the range from 1 ppm to 0.1% by weight, determinable, for example, by Karl Fischer titration.

In one embodiment of the present invention, inventive electrochemical cells comprise one or more conductive salts, preference being given to lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mXLi$, where m is defined as follows:
m=1 when X is selected from oxygen and sulfur,
m=2 when X is selected from nitrogen and phosphorus, and
m=3 when X is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium and toward lithium sulfides and lithium polysulfides. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, the separators selected may be separators made from PET nonwovens filled with inorganic particles. Such separators may have a porosity in the range from 40 to 55%. Suitable pore diameters are, for example, in the range from 80 to 750 nm.

Inventive electrical cells are notable for particularly high capacitances, high performance even after repeated charging, and significantly delayed cell death. Shuttling can be suppressed very efficiently. Inventive electrical cells are very suitable for use in automobiles, aircraft, ships or stationary energy stores. Such uses form a further part of the subject matter of the present invention.

The present invention further provides a process for producing inventive composite materials, which is also referred to as inventive production process in the context of the present invention. The inventive production process comprises at least one process step wherein (A) at least one organic polymer,
(B) sulfur,
(C) carbon in a polymorph which comprises at least 60% $sp^2$-hybridized carbon atoms and
(D) 2-20% by weight of a perfluorinated or partly fluorinated polymer, based on the total weight of components (A), (B) and (C) used are reacted with one another at temperatures in the range from 150 to 400° C., preferably 200 to 350° C.

In this process, organic polymer (A), sulfur (B), carbon (C) and perfluorinated or partly fluorinated polymer (D) are each as defined above, especially also with regard to preferred embodiments thereof.

Organic polymer (A) is preferably selected from polyethylene, polypropylene, polyacrylonitrile, polybutadiene, polystyrene and copolymers of at least two comonomers selected from ethylene, propylene, styrene, acrylonitrile and 1,3-butadiene, most preferably from acrylonitrile.

Components (A), (B), (C) and (D) are combined with one another before the thermal reaction in ratios that the person skilled in the art can calculate in a simple manner proceeding from the desired final composition after the thermal reaction and taking account of the gaseous by-products which potentially form in the thermal reaction, such as hydrogen sulfide in particular.

The inventive production process can be performed in the presence of a solvent, for example toluene or ethanol. However, preference is given to performing the inventive production process without solvent.

In one embodiment of the present invention, the inventive production process is performed at ambient pressure, i.e. at standard pressure.

In another embodiment of the present invention, the inventive production process is performed at elevated pressure, for example at 1.1 to 100 bar.

In another embodiment of the present embodiment, the inventive production process is performed at autogenous pressure. For this purpose, it is possible to establish any pressure, for example 10 bar or else standard pressure, and the reaction is performed in a pressure vessel, for example an autoclave. Gaseous by-products which form, especially $H_2S$, can increase the pressure during the reaction, for example to pressures of up to 100 bar or else more. If it is desired to perform the inventive production process under autogenous pressure, the pressure measurement can be used to monitor the reaction.

In one embodiment of the present invention, the inventive production process can be performed over a period in the range from 10 minutes up to 100 hours, preference being given to two to 24 hours.

It is preferred, after the reaction has ended, to free the inventive composite material obtained of $H_2S$, for example to degas it. The degassing can be accomplished, for example, by evacuating or by purging with an inert gas, for example with nitrogen or with a noble gas such as argon.

Inventive composite material is obtained, generally in powder form.

The present invention further provides a process for operating automobiles, aircraft, ships or stationary energy stores using at least one inventive electrical cell.

The invention is illustrated by the nonlimiting examples which follow.

Figures in % relate to percent by weight, unless explicitly stated otherwise.

I. Synthesis of Composite Materials

I.1 Synthesis of a Comparative Composite Materials C-CM.1 (Carbon Black-PAN-S Composite)

20 g of sulfur, 10 g of polyacrylonitrile and 6 g of carbon black (commercially available as Ketjen Black) were homogenized in a mortar and charged into a 300 ml autoclave. Conversion was effected at 280° C. under autogenous pressure and with stirring (300 rpm) for 12 h. In the course of this, the pressure rose to 43 bar. Subsequently, the $H_2S$ which formed was vented off via an NaOH scrubber, and the composite was purged with nitrogen for 24 h. 29.4 g of hard, dark gray to black powder C-CM.1 were obtained.

Elemental Analysis:
C=43.5 g/100 g
S=45.8 g/100 g
N=7.5 g/100 g
H=1.4 g/100 g.

1.2 Synthesis of an Inventive Composite Material CM.2 (PTFE-Carbon Black-PAN-S Composite)

19.1 g of sulfur, 6.4 g of polyacrylonitrile, 4.5 g of carbon black (commercially available as Ketjen Black) and 2.1 g of Teflon powder with an average particle size of 1 μm were homogenized in a mortar and charged into a 300 ml autoclave. Conversion was effected at 280° C. under autogenous pressure with stirring (300 rpm) for 12 h. In the course of this, the pressure rose to 21 bar. Subsequently, the $H_2S$ which formed was vented off via an NaOH scrubber and the composite was purged with nitrogen for 24 h. 25.2 g of fine pulverulent material CM.2 were obtained.

Elemental Analysis:
C=35.3 g/100 g
S=50.0 g/100 g
N=6.3 g/100 g
H=<0.5 g/100 g.

II. Production of Electrodes

II.1 Production of a Comparative Cathode C-C.1 from C.CM.1

To produce the ink, 0.09 g of Teflon, 0.05 g of graphite (commercially available as KS6 from Timcal AG, 6743 Bodio, Switzerland) and 1.67 g of C-CM.1 were added to 17.0 g of water/isopropanol and stirred. For dispersion, the mixture was transferred to a stainless steel grinding vessel and then a ball mill (Pulverisette from Fritsch) was used, stirring with stainless steel balls at 300 rpm for 30 min. The dispersion resulted in a very homogeneous ink with creamy consistency. The ink was sprayed onto aluminum foil by means of an airbrush process on a vacuum table (temperature: 60° C.). Nitrogen was used for spraying. A solids loading of 2.5 mg/cm$^2$ was achieved.

II.2 Production of an Inventive Cathode C.2 from CM.2

To produce the ink, 0.04 g of graphite (commercially available as KS6 from Timcal AG, 6743 Bodio, Switzerland) and 1.69 g of CM.2 were added to 17.0 g of water/isopropanol and the mixture was stirred. For dispersion, the mixture was transferred to a stainless steel grinding vessel and then a ball mill (Pulverisette from Fritsch) was used, stirring with stainless steel balls at 300 rpm for 30 min. The dispersion resulted in a very homogeneous ink with creamy consistency. The ink was sprayed onto aluminum foil by means of an airbrush process on a vacuum table (temperature: 60° C.). Nitrogen was used for spraying. A solids loading of 2.5 mg/cm² was achieved.

III. Testing of the Cathodes in Electrochemical Cells

For the electrochemical characterization of the comparative cathode C-C.1 and of the inventive cathode C.2, electrochemical cells were constructed according to FIG. 1. For this purpose, in addition to the cathodes produced in II., the following components were used in each case:

Anode: Li foil, thickness 50 μm,
Separator: microporous, three-ply membrane (PP/PE/PP), thickness 38 μm (commercially available as Celgard® 2340)
Cathode: according to example II.
Electrolyte: 1M LiTFSI (LiN(SO₂CF₃)₂) in 1:1 mixture of dioxolane and dimethoxyethane FIG. 1 shows the schematic construction of a dismantled electrochemical cell for testing of inventive composite materials The annotations in FIG. 1 mean:
1, 1' Dies
2, 2' Nuts
3, 3' Sealing rings—double in each case, the second, somewhat smaller sealing ring in each case is not shown here
4 Spiral spring
5 Output conductor made from nickel
6 Housing The charging and discharging of the particular cell was conducted with a current of 7.50 mA at potentials in the range from 1.8 to 2.5 V. The results are compiled in Table 1.

TABLE 1

Test results of inventive and noninventive electrochemical cells

| Example | Discharge capacity 5th cycle [mA · h/g S] | Discharge capacity 50th cycle [mA · h/g S] | Discharge capacity 100th cycle [mA · h/g S] |
|---|---|---|---|
| Cathode C-C.1 based on C-CM.1 | 830 | 690 | — (battery collapses) |
| Cathode C.2 based on CM.2 | 870 | 850 | 700 |

The invention claimed is:

1. A process for producing composite materials, comprising at least one process step wherein
    (A) at least one organic polymer,
    (B) sulfur,
    (C) carbon in a polymorph which comprises at least 60% sp²-hybridized carbon atoms and
    (D) 2-20% by weight of a perfluorinated or partly fluorinated polymer, based on the total weight of components (A), (B) and (C) used are reacted with one another at temperatures in the range from 200 to 400° C.

2. The process according to claim 1, wherein the composite material comprises particles or domains which comprise carbon (C) filled with sulfur (B).

3. The process according to claim 1, wherein organic polymer (A) is selected from polyethylene, polypropylene, polyacrylonitrile, polybutadiene, polystyrene and copolymers of at least two comonomers selected from ethylene, propylene, styrene, acrylonitrile and 1,3-butadiene.

4. The process according to claim 1, wherein organic polymer (A) is polyacrylonitrile.

5. The process according to claim 4, wherein polyacrylonitrile (A) is present after the reaction at least partially in the form of a cyclization product of the formula I

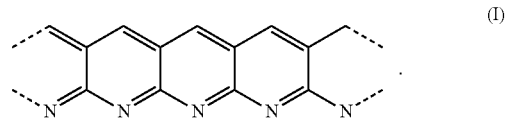

6. The process according to claim 4, wherein polyacrylonitrile (A) before the reaction has a mean molecular weight $M_w$ in the range from 50 000 to 250 000 g/mol.

7. The process according to claim 1, wherein carbon (C) is carbon black.

8. The process according to claim 1, wherein the perfluorinated or partly fluorinated polymer (D) is polytetrafluoroethylene.

9. The process according to claim 1, wherein (A) is polyacrylonitrile, (C) is carbon black and (D) is polytetrafluoroethylene.

* * * * *